W. M. HARLEY.
PNEUMATIC TIRE.
APPLICATION FILED OCT. 14, 1908.
949,472.
Patented Feb. 15, 1910.
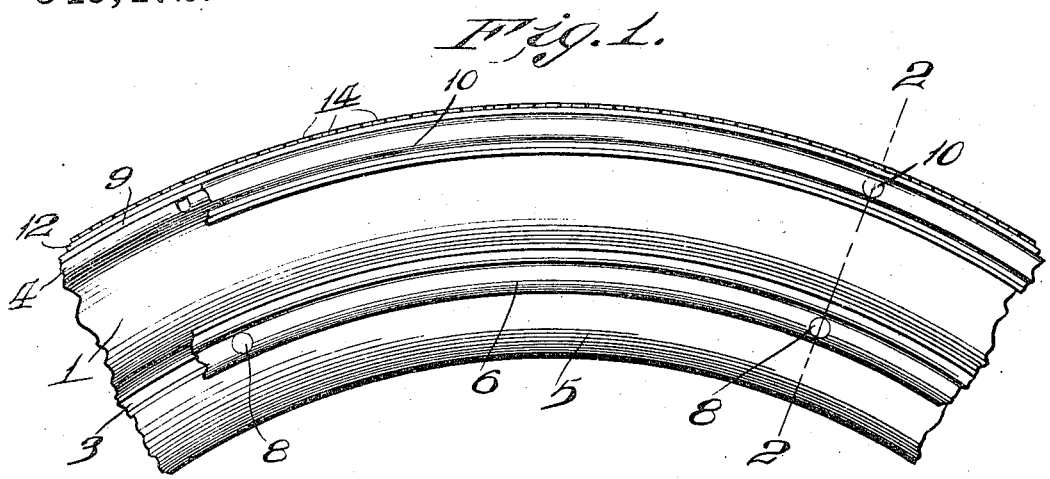
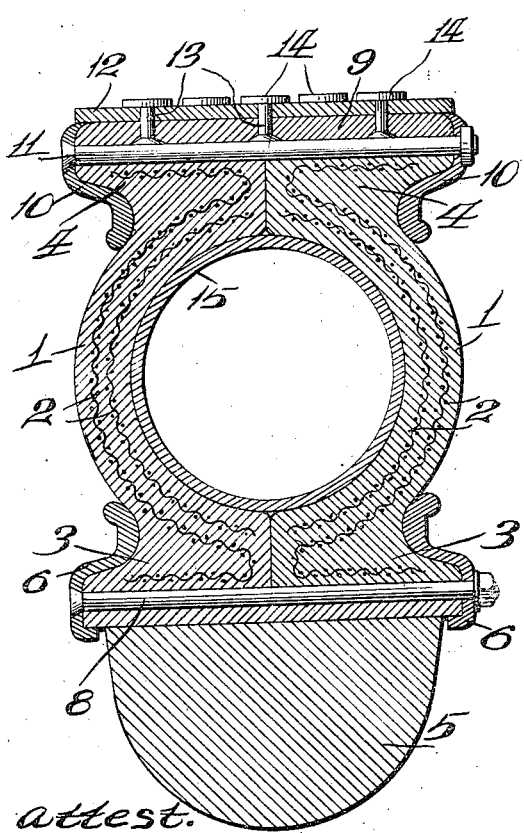
attest.
A. G. Fletcher.
M. O. Smith.
Inventor.
William M. Harley.
By Higdon & Longan
attys.

UNITED STATES PATENT OFFICE.

WILLIAM M. HARLEY, OF ST. LOUIS, MISSOURI, ASSIGNOR TO JOHN WEERTS, OF ST. LOUIS, MISSOURI.

PNEUMATIC TIRE.

949,472.  Specification of Letters Patent.  Patented Feb. 15, 1910.

Application filed October 14, 1908. Serial No. 457,596.

*To all whom it may concern:*

Be it known that I, WILLIAM M. HARLEY, a subject of the King of Great Britain, and resident of St. Louis, Missouri, have invented certain new and useful Improvements in Pneumatic Tires, of which the following is a specification containing a full, clear, and exact description, reference being had to the accompanying drawings, forming a part hereof.

My invention relates to a pneumatic tire, the object of my invention being to construct a simple, inexpensive tire, wherein the inflatable inner tube may be readily inserted or removed, and the outer tube is provided with a protecting tread, which minimizes the danger of the inner tube's becoming deflated as a result of puncture.

To the above purposes, my invention consists in certain novel features and arrangement of parts hereinafter described, claimed, and shown in the accompanying drawings, in which:

Figure 1 is a side elevation of a tire of my improved construction, the same being applied to the rim of a wheel; Fig. 2 is an enlarged cross section, taken approximately on the line 2—2 of Fig. 1.

In the construction of my improved tire, the outer tube is made up of a pair of mating sections 1, which are semi-circular in cross section and formed of rubber or analogous material, in which is embedded sections 2 of fabric; and formed integral with the meeting edges of these mating parts of the outer tube are flanges 3 and 4. The pair of flanges 3 which are on the inside of the outer tube fit on the metal tire of the rim 5 of the wheel, and engaging over these flanges 3 are retaining rings 6, which engage the metal tire applied to the rim 5, and passing through the flanges 3 and through said rings 6 are bolts 8. Fitted onto the tread portion of the outer tube and on the flanges 4 is a metal band 9, the same being rigidly held in position by rings 10, which engage the side edges of said band, and said rings engaging the flanges 4, and being rigidly connected to the outer tube by means of bolts 11. A band 12 of leather or analogous material is fitted onto the metal band 9, and passing through said band are rivets 13, the heads 14 of which lie flat upon the leather band 12, and thus forms a tread surface which is both wear resisting and non-slipping while in use. An inflatable inner tube 15 is positioned within the outer tube, said inner tube being provided with the usual inflating valve, (not shown).

A tire of my improved construction is simple, strong and durable, is practically proof against puncture, owing to the arrangement of the armor, comprising the metal and leather bands arranged on the tread portion of the outer tube, and when desired the inner tube may be readily removed and replaced, by removing the nuts from the bolts 8 and 11, which action permits the rings 6 and 10 on one side of the tire and one-half of the outer tube to be readily removed.

Thus it will be seen how I have produced a tire wherein the inner tube is readily accessible, and which tire possesses superior advantages in point of simplicity, durability and general efficiency.

I claim:

A pneumatic tire, comprising an outer tube made in mating parts, each of which parts is semi-circular in cross-section and provided with vertical abutting faces at their inner and outer margins, and lateral, outwardly projecting, integral flanges at their inner and outer margins, an inflatable inner tube positioned between the mating parts of the outer tube, separable retaining rings applied to the inner pair of flanges of the outer tube engaging and detachably secured to the metal tire of the wheel, means for detachably securing said rings to said flanges and tire, a metal band applied to the tread portion of the outer tube, separable retaining rings engaging said metal band and the outer flanges of the outer tube, means for detachably securing said rings to said metal band and outer flanges, a flexible tread band applied to the outer surface of the metal band and means for securing the flexible tread to the metallic band.

In testimony whereof, I have signed my name to this specification, in presence of two subscribing witnesses.

WILLIAM M. HARLEY.

Witnesses:
M. P. SMITH,
E. L. WALLACE.